United States Patent Office 3,164,421
Patented Jan. 5, 1965

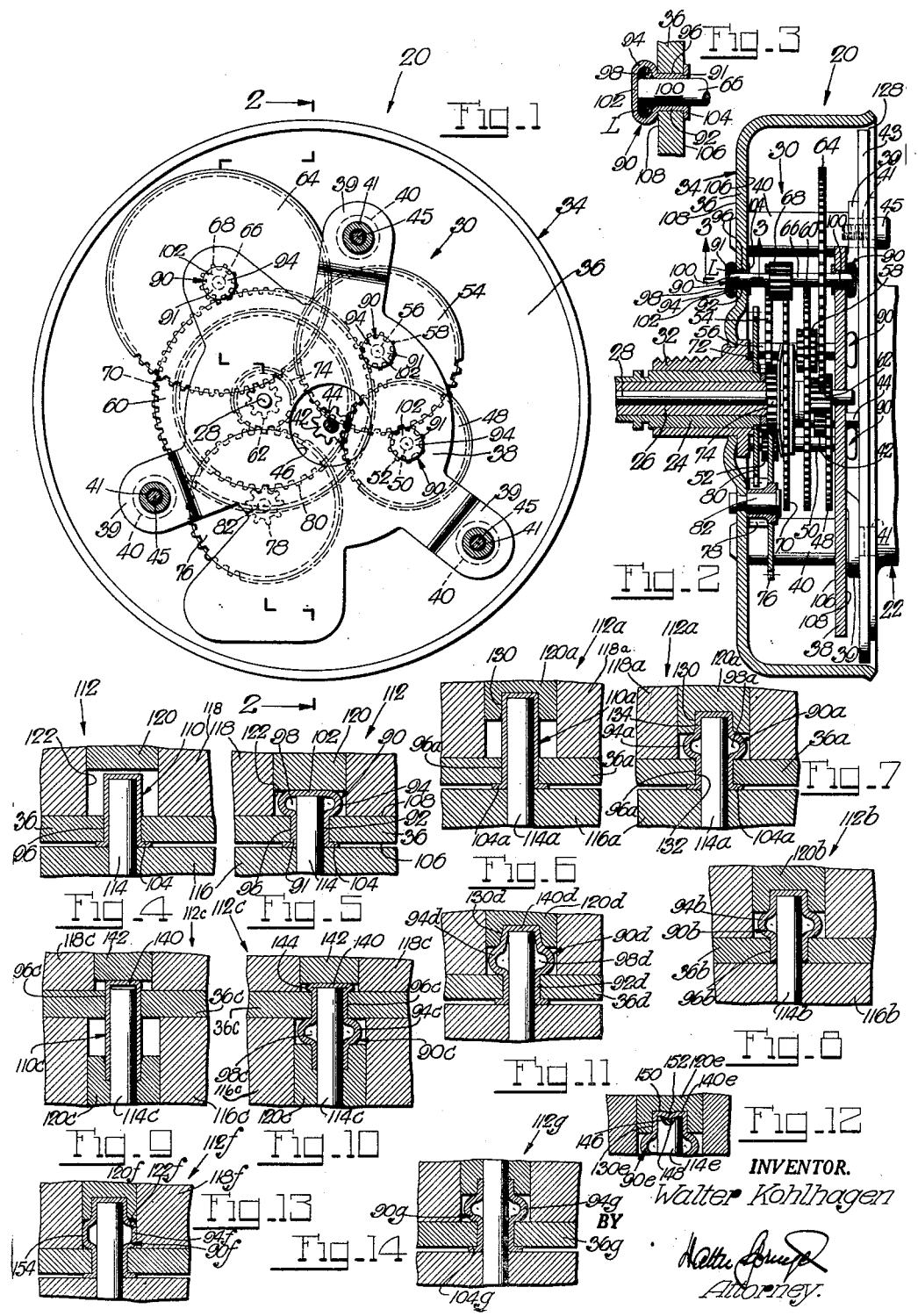

3,164,421
JOURNAL-TYPE STAFF BEARINGS FOR MOVEMENTS AND THE LIKE
Walter Kohlhagen, Elgin, Ill., assignor to Amphenol-Borg Electronics Corporation, Delavan, Wis., a corporation of Delaware
Filed July 28, 1961, Ser. No. 127,536
5 Claims. (Cl. 308—121)

This invention relates to bearings for gear trains in general, and to staff bearings for movements in particular.

The present invention is concerned primarily, though not exclusively, with movements of clocks and other timing devices, which are basically gear trains that are mostly arranged between pillar-spaced endplates with which they form self-contained units. These gears are either turnable on fixed staffs or mounted on rotary staffs between the endplates, or are arranged in combinations of both. While mounted gears on rotary staffs are preferable to rotary gears on fixed staffs, the cost of adequate end bearings for rotary staffs and their assembly with the endplates is sufficiently high to warrant their use only in the higher-grade and, hence, higher-price movements.

It is an object of the present invention to provide for the rotary staffs of movements precision end bearings of combined journaled and thrust type which have abundant bearing area, low operating friction and minimum wear, as well as efficient lifetime lubrication, yet their cost of manufacture and assembly with the endplates of movements is incomparably lower than that of prior end bearings of this type. The contemplated end bearings are thus adapted not only for use in movements of the higher grades at a considerable saving in overall cost, but also for use in low-cost movements at only insignificantly higher overall cost which is more than offset by their improved quality by virtue of the use of these bearings.

It is another object of the present invention to provide for a rotary staff of a movement an end bearing of this type which is in the exceedingly simple form of a metal shell which takes up endthrust at its closed end and has a peripherally enlarged part that serves as a lubricant reservoir, and which may securely be mounted in the movement by simply pressing a length of the shell into a hole in one of the endplates. Thus, this simple bearing not only has the bearing accuracy of a fitted bushing in the endplate, but it may also be of any desired length in excess of the wall thickness of the endplate as well as of any desired bearing metal irregardless of the material of the endplate. Also, while the lubricant reservoir in the bearing is in the simple form of a peripherally enlarged part of the shell, it is effectively sealed from the outside by the staff end in the bearing so that the lubricant supply therein will suffice for efficient lifetime lubrication of the bearing. Further, the simple mount of the bearing in the endplate also seals at this bearing, as well as at other like bearings in both endplates, an enclosure of a movement which is otherwise sealed and formed in part by the endplates.

It is a further object of the present invention to provide for a rotary staff of a movement an end bearing of the aforementioned shell-type the peripherally enlarged part of which may be of any diameter and axial extent, within limits, for an advantageously large volume of the lubricant reservoir, and the enlarged lubricant reservoir part of the shell may also be provided intermediate the ends or at the closed end of the shell for any desired plural or singular journal bearing arrangement in the bearing as well as for most efficient lubrication of the bearing throughout and including its thrust end.

Another object of the present invention is to form an end bearing of the aforementioned sleeve-type from a simple machine-produced shell blank, by simply upsetting the blank under axial compression in a die while the blank is contained in the die in such manner that only a predetermined length of the cylindrical blank wall will give way under the compression by peripheral expansion into an enlarged formation which serves as a lubricant reservoir. Thus, these end bearings not only lend themselves to most efficient mass production at exceedingly low cost by mere subjection of their machine-produced blanks to a simple die operation but they are also in their important bearing size accurate within die tolerance regardless of even wide tolerances of their original blanks.

A further object of the present invention is to form the aforementioned shell blanks into the finished end bearings advantageously while mounting them in an endplate of a movement, by first placing a shell blank in its reception hole in the endplate, and then upsetting the shell blank in a die in which the endplate and blank are contained so that only a predetermined length of the cylindrical blank wall protruding from the endplate will give way by bulging outwardly into an enlarged peripheral formation. In thus finish-forming an end bearing while mounting it at the same time in an endplate, it will not only be accurate in its bearing size within the close tolerances of the forming die and will also become permanently locked in the endplate with particular firmness since its reception hole in the endplate forms in fact a part of the die in which the bearing blank is contained and, hence, compacted under the compressive stresses from the upsetting operation, but the cost of thus forming an end bearing and assembling it with an endplate is also kept at an absolute minimum.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a section through a movement embodying the present invention;

FIG. 2 is a section through the same movement taken substantially on the line 2—2 of FIG. 1;

FIG. 3 is an enlarged fragmentary section through a part, including a featured staff bearing, of the movement as taken on the line 3—3 of FIG. 2;

FIGS. 4 and 5 show progressive steps in the formation of the featured staff bearing in accordance with a method of the present invention;

FIGS. 6 and 7 show progressive steps in the formation of a staff bearing which embodies the present invention in a modified manner;

FIG. 8 shows the formation of a staff bearing which embodies the present invention in another modified manner;

FIGS. 9 and 10 show progressive steps in the formation of a staff bearing which embodies the present invention in a further modified manner; and FIGS. 11 to 14 show the formation of different staff bearings, respectively, which embody still other modified aspects of the present invention.

Referring to the drawings, and more particularly to FIGS. 1 and 2 thereof, the reference numeral 20 designates an exemplary movement of a timing device, presently of a clock, which has a synchronous motor 22 for its prime mover. The present movement 20 comprises hour, minute and second shafts 24, 26 and 28 which carry the usual hour, minute and sweep-second hands (not shown), and a gear train 30 which connects the motor 22 with these shafts. The hour, minute and second shafts 24, 26 and 28 are nested in conventional manner and received in a mounting sleeve 32 on a cup-shaped gear case 34 the bottom 36 of which forms one of the endplates of the present movement, with the opposite endplate 38 being held in spaced parallel relation therewith by pillars 40. In the present instance, the endplate 38 has apertured lugs 39 which are located on reduced ends 41 of the pillars 40. Also located on these reduced pillar ends 41 is the motor 22, presently with its outer field plate 43, with the motor 22 and the adjacent endplate 38 being secured to the pillars 40 by screws 45.

The gear train 30 comprises, in the present instance, a pinion 42 on the output shaft 44 of the synchronous motor 22 which projects through an aperture 46 in the endplate 38 and is in mesh with a gear 48 on a staff 50 that also carries a pinion 52 which is in mesh with a gear 54 on a staff 56. Also carried by the staff 56 is a pinion 58 which is in mesh with a gear 60 that is mounted on the second shaft 28. Turning with the gear 60 is a pinion 62 which is in mesh with a gear 64 on a staff 66 that also carries a pinion 68 which is in mesh with a gear 70. Gear 70 is turnable on the second shaft 28 and coupled to the minute shaft 26 by a friction disc 72, thus normally driving the minute shaft and also permitting setting of the same, and also of the hour shaft 24 as will appear presently. Carried by the minute shaft 26 is a pinion 74 which is in mesh with a gear 76 having a coaxial pinion 78 that is in mesh with a gear 80 on the hour shaft 24. The gear 76 and pinion 78 are turnable on a stud 82 on the endplate 36. The described gear train 30, presently of reduction-type, is entirely conventional and will drive the hour, minute and second shafts 24, 26 and 28 at the usual rates.

The staffs 50, 56 and 66 are rotary staffs, permitting their respective gears and pinions to be advantageously pressfitted thereon. For the rotary support of these staffs, there are provided end bearings 90 which form the subject matter of the present invention. These end bearings are in the present instance identical, wherefore a detailed description of the end bearings 90 for the staff 66 in FIGS. 1 to 3 will suffice for a clear understanding of all of these end bearings. Thus, the aligned end bearings 90 for the staff 66 are self-lubricating bearings of combined journal and thrust type which are distinguished by their precision performance as well as by their exceedingly simple structure and assembly with the endplates 36 and 38. To begin with, these exemplary end bearings 90 are single bearing elements 91 having sleeve parts 92 and continuing peripherally enlarged parts 94, of which the sleeve parts 92 are mounted like bushings in aligned apertures 96 in the respective endplates 36 and 38 and the enlarged parts 94 serve as reservoirs 98 for a suitable lubricant L, such as oil or grease. The journal ends 100 of the staff 66 are received with a bearing fit in the sleeve parts 92 of the bearing elements 91 and extend into the lubricant reservoirs 98 which they seal from the outside and from which they draw lubricant by capillary action for their adequate lubrication for the life of the movement. The endwalls 102 of the enlarged parts 94 of the bearing elements 91 serve as endthrust bearings for the staff 66, with the latter preferably having some slight endplay for freedom of motion and minimum operational friction. The bearing elements 91 are firmly mounted and, hence, located in the apertures 96 in the respective endplates 36 and 38 by being with their sleeve parts 92 preferably pressfitted therein. The sleeve parts 92 of the bearing elements 91 terminate in the present instance in end flanges 104 which rest against the inner faces 106 of the respective endplates 36 and 38, while the enlarged parts 94 of these bearing elements rest against the outer faces 108 of the respective endplates, wherefore the bearing elements 91 are also interlocked with their endplates against removal therefrom.

The end bearings 90 are formed and assembled with their respective endplates 36 and 38 in accordance with a method which is part of the present invention. This method is demonstrated in FIGS. 4 and 5 in the formation of one of these end bearings and its simultaneous assembly with the endplate 36. Thus, the end bearing is formed from a metal shell blank 110 which may be, and preferably is, a simple and inexpensive machine-produced part, customarily die-drawn. The shell blank 110, which is cylindrical and of uniform wall-thickness and has the outward flange 104 at its open end, is first inserted into the aperture 96 in the endplate 36 which may conveniently be a punched hole therein. The endplate 36 and inserted shell blank 110 may then be placed in a die 112, with the shell blank being located on a pin 114 that is axially slidable in a lower die block 116 on which the shell blank rests with its flange 104. The pin 114 is normally spring-urged into the projected position shown in FIG. 4. A clamping member 118 of the die is then closed on the endplate 36 to hold the same and the inserted shell blank firmly on the die block 116 (FIG. 4). Next, a ram 120 is lowered from the position shown in FIG. 4 to that shown in FIG. 5, in the course of which the length of the shell blank protruding from the endplate 36 is upset into the peripherally enlarged part 94, which forms the lubricant reservoir 98, with the pin 114 yielding to the necessary extent while exerting sufficient pressure on the closed end of the shell blank to hold it against inward collapse under the force of the ram 120, so that the deformation of the shell blank by the upsetting action of the ram is confined to the cylindrical wall of the shell blank, as will be readily understood. The center aperture 122 in the clamping member 118 is preferably sufficiently large to permit the blank wall freely to expand peripherally at 94 under the upsetting action of the ram 120. The formation of the end bearing 90 and its assembly with the endplate 36 is now completed, and the endplate with its bearing is removed from the die after opening the same by raising the clamping member 118 and ram 120.

It follows from the preceding description that mere insertion of a simple machine-produced shell blank into a preferably punched hole in an endplate and simple upsetting of a length of the blank in a die complete the formation of a self-lubricating end bearing of combined journal and thrust type as well as its final assembly with the endplate. Yet, despite the usual wide tolerances of inexpensive machine-produced shell blanks and the inherent tolerances in size and shape of punched holes in an endplate, the end bearing formed and assembled with the endplate in the described manner has the attributes of a precision bearing in all essential respects. Thus, except for leaving the length of the shell blank 110 intended for the lubricant reservoir free for outward deformation, the die 112 contains the endplate 36 and the remainder of the shell blank during the entire upsetting operation. Hence, as the stresses ensuing from the upsetting operation exert themselves on the blank, the parts thereof contained in the die will be forced into conformity with the adjacent die surfaces, including the pin 114 thereof, wherefore the finished end bearing is in the important respect of its bearing size, journal as well as thrust, accurate within die tolerance. Furthermore, by virtue of the axial orientation of the original shell blank 110 in the endplate 36 on the die pin 114 and its conformity to the same on the upsetting operation in any event, the axial disposition of the finished end bearing on the endplate is determined by the die and is normal to the plane of the endplate within die tolerance and, hence, unaffected by possible slight deviation of the punched mounting hole in the endplate from an axis normal to the plane of the latter. Also, while the die-contained length of the shell blank will on the upsetting operation conform to the die pin 114 in any event and be even sized thereby, the distortive stresses in the shell blank from the upsetting operation will also force the cylindrical blank wall into a sufficiently tight fit with all or part of the punched hole 96 in the endplate 36 securely to lock this wall and, hence, the finished bearing therein despite possible off-shape of this punched hole.

The present end bearings 90 have the further advantage that they may be of most any desired metal of particular bearing properties irregardless of the material of the endplates. Thus, shell blanks of any and all suitable bearing metals and of even wide tolerances which lend themselves to efficient mass production in machines may in accordance with the present method be readily formed into precision bearings and also assembled with endplates. The described method of forming a shell blank into a finished end bearing also points clearly at the wide range within which the shape and also the dimensions and, hence, volume of the lubricant reservoir may be varied by varying the length of the shell blank or the upsetting stroke of the die ram, or both. Moreover, since the finish-formation of a simple shell blank into an accurate self-lubricating journal and thrust bearing and its complete and secure assembly with an endplate involves, besides insertion of the blank in a hole in the endplate, mere subjection of the inserted blank to an upsetting operation in a simple die and, hence, permanent deformation of a part of the blank, the wall thickness of the shell blank may be, and advantageously is, rather small, but ensuing savings in cost of blank material as well as ready formation of the blank into the finished end bearing with its important bearing size and axial disposition on the endplate being particularly accurate within the closed tolerances of the die regardless of the tolerances of the original blank.

Since in the exemplary movement 20 each endplate 36 and 38 has a plurality of the featured end bearings 90, in this instance three, these end bearings may advantageously be formed and assembled with each endplate simultaneously in a single operation, even if the end bearings in each endplate should have different dimensions for rotary staffs of different sizes which they do not have in the present example.

A die for this purpose is self-suggestive in view of the exemplary die 112 of FIGS. 4 and 5 for the formation of a single end bearing and its assembly with an endplate. Also, the present featured end bearings, by sealing the endplates on the outside, lend themselves admirably to movements which are sealed-in, or substantially so, in order to be protected from dirt and dust. In this respect, the present movement 20 is effectively sealed, since the endplate 36 is part of the cup-shaped case 34 within which the other endplate 38 is located and the open end 128 of which is effectively closed by the outer field plate 43 of the motor 22.

While the described end bearings 90 are in their journal bearing lengths limited substantially to the thickness of the endplates, FIGS. 6 and 7 show the formation in accordance with the same method of an end bearing 90a which may have a journal bearing of most any desired length, within limits, and in excess of the thickness of its endplate 36a. The present bearing 90a is formed from a shell blank 110a which is longer than the blank 110 of FIG. 4 for the increased journal bearing length of the finished bearing. In its formation into the finished bearing 90a and simultaneous assembly with the endplate 36a, the blank 110a is first inserted into a conveniently punched hole 96a in the endplate 36a, whereupon the endplate and inserted blank are placed in a die 112a (FIG. 6) which may in all respects be like the die 112 of FIG. 4, except that the upsetting ram 120a of the present die has an annular recess 130 in which to contain an endlength of the blank. After placing the endplate 36a and inserted blank 110a on the lower section of the die 112a, i.e., the die block 116a and pin 114a, the clamping member 118a is lowered for firm retention of the endplate and inserted blank on the die block 116a for the following upsetting operation by the ram 120a on its downstroke in the course of which it will first project with its annular recess 130 over the adjacent endlength of the blank 110a (FIG. 6) and then upset into the lubricant reservoir formation 94a the intermediate length of the blank which in the die is free to deform outwardly. The end bearing 90a is now finish-formed and also assembled with the endplate 36a, and the die is opened for the removal of the endplate and its bearing.

The present end bearing 90a has all the advantages of the first described bearing 90 and has the additional advantage of a journal bearing length which is considerably in excess of the thickness of the endplate 36a. Also, with the lubricant reservoir 98a being formed by the intermediate portion 94a of the finished bearing, the journal bearing part of the latter is interrupted at the lubricant reservoir and divided thereby into successive bearing sections 132 and 134 which in use of the end bearing are lubricated equally well from the reservoir.

While the described end bearings 90 and 90a of FIGS. 5 and 7 have for their interlock with their respective endplates' end flanges 104 and 104a, respectively, FIG. 8 shows the formation from a flangeless shell blank of an end bearing 90b and its assembly with an endplate 36b which lacks interlock with the latter but is nevertheless secure. Thus, the original flangeless shell blank is first inserted with its open end in a hole 96b in the endplate 36b, whereupon an intermediate length of the blank is upset into the lubricant reservoir formation 94b in a die 112b which may in all respects be like the die 112a of FIGS. 6 and 7, except that the pin 114b is preferably held in the illustrated lower position on opening the die and is preferably also further retracted downwardly until it clears the endplate 36b for the removal of the latter with its finished bearing from the die. In operating the pin 114b in this preferred manner, the finished bearing 90b will remain securely mounted in the endplate 36b on the retraction of the ram 120b and the latter will readily separate from the bearing, owing to the fact that the pin 114b will then by its friction hold on the bearing contribute the predominant part of the overall force with which the bearing is retained in the endplate.

The formation of the present end bearing 90b and its simultaneous assembly with the endplate 36b in the die 112b also brings to mind the feasibility of forming the end bearing 90b without simultaneously assembling it with an endplate. To this end, the endplate 36b in the die 112b in FIG. 8 may be an inseparable part of the die and may even be an integral part of the die block 116b. With the die arranged in this manner, the original shell blank is simply inserted into the aperture 96b in the lower die section and is then formed into the finished bearing 90b as before. The die is thereupon opened and the pin 114b may then be operated as a knock-out pin to remove the bearing from the aperture 96b in the lower die section, whereupon the bearing may readily be stripped from the pin 114b on mere retraction of the latter into the lower die section.

FIGS. 9 and 10 show the formation and assembly with an endplate 36c of an end bearing 90c which differs from the described end bearings 90, 90a and 90b by being mounted with its closed end in the endplate 36c, so that the bulk of the lubricant reservoir 98c and the entire journal bearing length are within the confines of a movement such as that shown in FIG. 2. To this end, the original shell blank 110c is first inserted into a hole 96c in the endplate 36c so that the closed blank end 140 protrudes somewhat from the endplate (FIG. 9). The endplate 36c and inserted blank 110c are next inserted into the then open die 112c which on suitable operation may hold the endplate and blank therein in the intermediate operating stage shown in FIG. 9 in which the endplate is firmly held on the die block 116c by the clamping member 118c, the pin 114c extends in the blank to the extent indicated, and the upsetting ram 120c, which is in this instance provided in the lower die section, receives the open end of the blank, while an upper staking ram 142 bears against the closed end 140 of the blank. Next, the upper ram 142 may be lowered into the position shown in FIG. 10 to flatten the closed blank end 140 against, and thus stake it at 144 to, the adjacent face of the endplate 36c, whereupon the lower ram 120c is raised to upset an intermediate length of the blank into the lubricant reservoir formation 94c (FIG. 10). The die is then opened and the endplate 36c with its finished bearing 90c removed from the die.

Reference is now had to FIG. 11 which shows the formation of an end bearing 90d that is quite similar to the end bearing 90a of FIG. 7, except that the present bearing lacks a journal bearing between its lubricant reservoir 98d and closed end 140d so that a long staff may be accurately journalled in the bushing-like part 92d of the bearing in the endplate 36d without interference from the thrust end 140d of the bearing which may cooperate with a rounded end of the staff such as that of the staff 66 in FIG. 2, for example. To this end, the recess 130d in the upsetting ram 120d is tapered as shown, so that on the upsetting stroke of the ram the blank length therein will flare into substantial conformity with the recess 130d while the continuing blank length to the endplate 36d will be upset into the lubricant reservoir formation 94d.

FIG. 12 shows the formation of an end bearing 90e which may in all respects be like the end bearing 90a of FIG. 7, except that the present end bearing has in its closed end 140e a central bead-like inward formation 146 for minimum contact area of the thrust end of the bearing with the end of a staff. To this end, the end of the die pin 114e is centrally dished at 148, and the bottom 150 of the annular recess 130e in the upsetting ram 120e is provided with a complemental pointed inward formation 152.

Reference is now had to FIG. 13 which shows the formation of an end bearing 90f that may in all respects be like the end bearing 90a of FIG. 7, except that the lubricant reservoir formation 94f of the present bearing is partially shaped by the die 112f to have over part of its lengthwise extent a cylindrical peripheral wall 154. To achieve this end, the circular aperture 122f in the clamping member 118f of the die is kept sufficiently small in diameter to be engaged by and confine the outwardly deforming blank wall during a shorter upsetting stroke of the ram 120f than in FIG. 7, so that the wall of the aperture 122f will shape the cylindrical wall part 154 of the lubricant reservoir formation 94f which, in consequence, will be longer but less bulging than the lubricant reservoir formation 94a in FIG. 7 while having the same volume as the latter.

Reference is finally had to FIG. 14 which shows the formation of a mere journal bearing 90g and its simultaneous assembly with an endplate 36g in accordance with the same method used for the other bearings. Thus, the original bearing blank is a cylindrical sleeve open at both ends and having an outward flange 104g at one end. The formation of this sleeve blank into the finished journal bearing 90g with its lubricant reservoir formation 94g and the simultaneous assembly of the bearing with the endplate 36g in the die 112g is obvious by now.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a movement, the combination with a support plate having an aperture, and a rotary staff, of a self-lubricating end bearing of combined journal and thrust type comprising a metal shell having a central axis and open at one end and closed at the other end, said metal shell having a wall of substantially uniform thickness, said wall having axially spaced cylindrical wall lengths which support said staff, one of said cylindrical wall lengths being immediately adjacent to said open shell end, a peripherally enlarged lubricant reservoir formed in said wall between and coaxial with said spaced cylindrical wall lengths, and having substantially greater cross-sectional area than said cylindrical wall lengths, said one cylindrical wall length being mounted in said plate aperture, and said reservoir being on one side of and abutting said plate, said staff extending in said shell throughout the axial extent of the same to and in bearing contact with said closed end, said staff being received with a clearance fit within said one cylindrical wall length so that lubricant is supplied thereto by capillary action from said reservoir and said reservoir is thereby sealed from the outside by said clearance fit, said reservoir being enlarged by axial upsetting of its wall into substantially particular section axially of said shell.

2. In a movement as set forth in claim 1, said mounting of said one cylindrical wall length is a pressfit in said plate aperture.

3. In a movement as set forth in claim 2, said one cylindrical wall length is pressfitted in said plate aperture and terminates as a flange resting against the face of said plate on the side thereof opposite said one side.

4. In a movement as set forth in claim 2, said one cylindrical wall length is pressfitted in said plate aperture and terminates as a flange resting against one face of said plate, and said reservoir abuts the opposite face of said plate.

5. In a movement, the combination with a support plate having an aperture, and a rotary staff, of a self-lubricating end bearing of combined journal and thrust type comprising a metal shell having a central axis and open at one end and closed at the other end, said metal shell having a wall of substantially uniform thickness, said wall having a cylindrical wall length, said wall length being immediately adjacent to said open shell end, a peripherally enlarged lubricant reservoir immediately adjacent said cylindrical wall length and extending to said closed end of said shell, said reservoir having a substantially greater cross sectional area than said cylindrical wall length, said cylindrical wall length being mounted in said plate aperture with a pressfit, and said reservoir being on one side of and abutting said plate, said staff extending in said shell throughout the axial extent of the same to and in bearing contact with said closed end, said staff being received with a clearance fit within said cylindrical wall length so that lubricant is supplied thereto by capillary action from said reservoir and said reservoir is thereby sealed from the outside by said clearance fit, said reservoir being enlarged by axial upsetting of its wall into substantially part-circular section axially of said shell.

References Cited in the file of this patent

UNITED STATES PATENTS

| | | |
|---|---|---|
| 1,371,022 | Ecaubert | Mar. 8, 1921 |
| 2,109,035 | Schafer | Feb. 22, 1938 |
| 2,143,551 | Gottlieb | Jan. 10, 1939 |
| 2,219,067 | Colomb | Oct. 22, 1940 |
| 2,330,729 | Meredith et al. | Sept. 28, 1943 |
| 2,446,515 | Weingart | Aug. 3, 1948 |
| 2,540,688 | Novy | Feb. 6, 1951 |
| 2,615,764 | Leake | Oct. 28, 1952 |
| 2,747,361 | Kohlhagen | May 29, 1956 |
| 2,771,786 | Gilbert et al. | Nov. 27, 1956 |
| 2,908,180 | Swenson | Oct. 13, 1959 |